(12) United States Patent
Sunaga

(10) Patent No.: US 9,869,827 B2
(45) Date of Patent: Jan. 16, 2018

(54) COMMUNICATION MODULE

(71) Applicant: Hitachi Metals, Ltd., Minato-ku, Tokyo (JP)

(72) Inventor: Yoshinori Sunaga, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/497,653

(22) Filed: Apr. 26, 2017

(65) Prior Publication Data

US 2017/0315309 A1  Nov. 2, 2017

(30) Foreign Application Priority Data

Apr. 27, 2016 (JP) .................................. 2016-089147

(51) Int. Cl.
 G02B 6/38 (2006.01)
 F21V 8/00 (2006.01)
 G02B 6/42 (2006.01)

(52) U.S. Cl.
 CPC ........... *G02B 6/3895* (2013.01); *G02B 6/003* (2013.01); *G02B 6/0038* (2013.01); *G02B 6/3897* (2013.01); *G02B 6/4284* (2013.01); *G02B 6/4292* (2013.01)

(58) Field of Classification Search
 None
 See application file for complete search history.

(56) References Cited

U.S. PATENT DOCUMENTS

| 6,986,679 B1 * | 1/2006 | Aronson | ............... H01R 25/00 439/170 |
| 2014/0023328 A1 * | 1/2014 | Lambourn | ............... G02B 6/42 385/92 |

FOREIGN PATENT DOCUMENTS

| JP | 2007-41444 A | 2/2007 |
| JP | 2016-9668 A | 1/2016 |

* cited by examiner

*Primary Examiner* — Chad H Smith
(74) *Attorney, Agent, or Firm* — Crowell & Moring LLP

(57) ABSTRACT

A communication module includes a metal housing, a module connector provided at a front surface of the housing, and a light guide which guides light that has gone out from a LED lamp provided on a host board of a communication device and entered interior of a cage through a through hole provided in a bottom surface of the cage. The light guide includes a light incoming portion, a light outgoing portion, and a light guiding portion. The light incoming portion is disposed at a bottom surface of the housing opposed to the bottom surface of the cage, the light outgoing portion is disposed at a back surface of the housing opposed to the front surface, and the light guiding portion extends between the light incoming portion and the light outgoing portion along the bottom surface of the housing.

4 Claims, 5 Drawing Sheets

COMMUNICATION MODULE

CROSS-REFERENCE TO RELATED APPLICATION

The present application claims priority from Japanese Patent Application No. 2016-089147 filed on Apr. 27, 2016, the content of which is hereby incorporated by reference into this application.

TECHNICAL FIELD OF THE INVENTION

The present invention relates to a communication module to and from which optical signals and electric signals are input and output.

BACKGROUND OF THE INVENTION

Communication devices and transmission devices (hereinafter, collectively referred to as "communication devices") such as network switches and servers are connected to other communication devices via communication cables in some cases. For example, a communication module provided at one end of a communication cable is connected to one communication device, and a communication module provided at the other end of the communication cable is connected to the other communication device. Specifically, one communication module is inserted in a slot provided in a front panel, a rear panel or the like of one communication device, and the other communication module is inserted in a slot provided in a front panel, a rear panel or the like of the other communication device. The communication module inserted in each of the slots is connected to a connector provided behind the slot. In the following description, the front panels, rear panels and the like of the communication devices provided with the slots to and from which the communication modules are inserted and removed will be collectively referred to as "panels" in some cases.

Herein, in order to realize further performance improvement and reduction in power consumption, it has been strongly desired for communication devices to realize high-density mounting. Under such circumstances, more communication modules than before are desired to be attachable to a communication device. In other words, more slots than before are desired to be provided on the panel of the communication device.

SUMMARY OF THE INVENTION

On the panel of the communication device and around the slot described above, a display lamp which shows the connection state between the communication device and the communication module and the transmission/reception state of signals between them, etc. is provided in some cases. As the display lamp, a LED lamp is generally used, and the connection state, the signal transmission/reception state, etc. are displayed by turning-on, turning-off, blinking and others of the LED lamp.

However, if more slots than before are provided on the panel of the communication device, the gaps between the adjacent slots are narrowed, and the space for providing the above-described display lamp cannot be ensured, or it is difficult to ensure the space. In addition, even if the space for providing the display lamp can be ensured, the communication modules are disposed at high density on the panel, so that the lamp may be shaded by the communication modules, which makes it difficult to visually confirm the display lamp.

An object of the present invention is to enable easy and reliable visual confirmation of the display lamp even in a case in which the communication modules are disposed at high density on the panel of the communication device.

A communication module of the present invention is a communication module inserted to and removed from a cage provided on a substrate of a communication device. The communication module includes: a metal housing; a module connector provided at a first surface of the housing and connected to a connector provided in the communication device; and a light guide configured to guide light that has gone out from a light source provided on the substrate and entered interior of the cage through a through hole provided in the cage. The light guide includes a light incoming portion to which the light which has entered the interior of the cage comes in, a light outgoing portion from which the light coming in from the light incoming portion goes out, and a light guiding portion configured to guide the light coming in from the light incoming portion to the light outgoing portion. The light incoming portion is disposed at a second surface of the housing opposed to a bottom surface of the cage provided with the through hole, the light outgoing portion is disposed at a third surface of the housing opposed to the first surface, and the light guiding portion extends between the light incoming portion and the light outgoing portion along the second surface.

In an aspect of the present invention, the light outgoing portion has a slender shape extending along one side of the third surface.

In another aspect of the present invention, a lens surface configured to converge the light which has entered the interior of the cage is formed in the light incoming portion, and a plurality of recesses and projections configured to diffuse the light guided by the light guiding portion to outside are formed in the light outgoing portion.

In another aspect of the present invention, a plurality of the light guides which guide lights that have gone out from different light sources are provided.

In another aspect of the present invention, the plurality of light guides include two light guides, and the light outgoing portion of one of the light guides has a slender shape extending along one side of the third surface and the light outgoing portion of the other light guide has a slender shape extending along another side of the third surface.

According to the present invention, the display lamp can be easily and reliably confirmed visually even in the case in which the communication modules are disposed at high density on the panel of the communication device.

BRIEF DESCRIPTIONS OF THE DRAWINGS

DESCRIPTIONS OF THE PREFERRED EMBODIMENT

Figure 1:
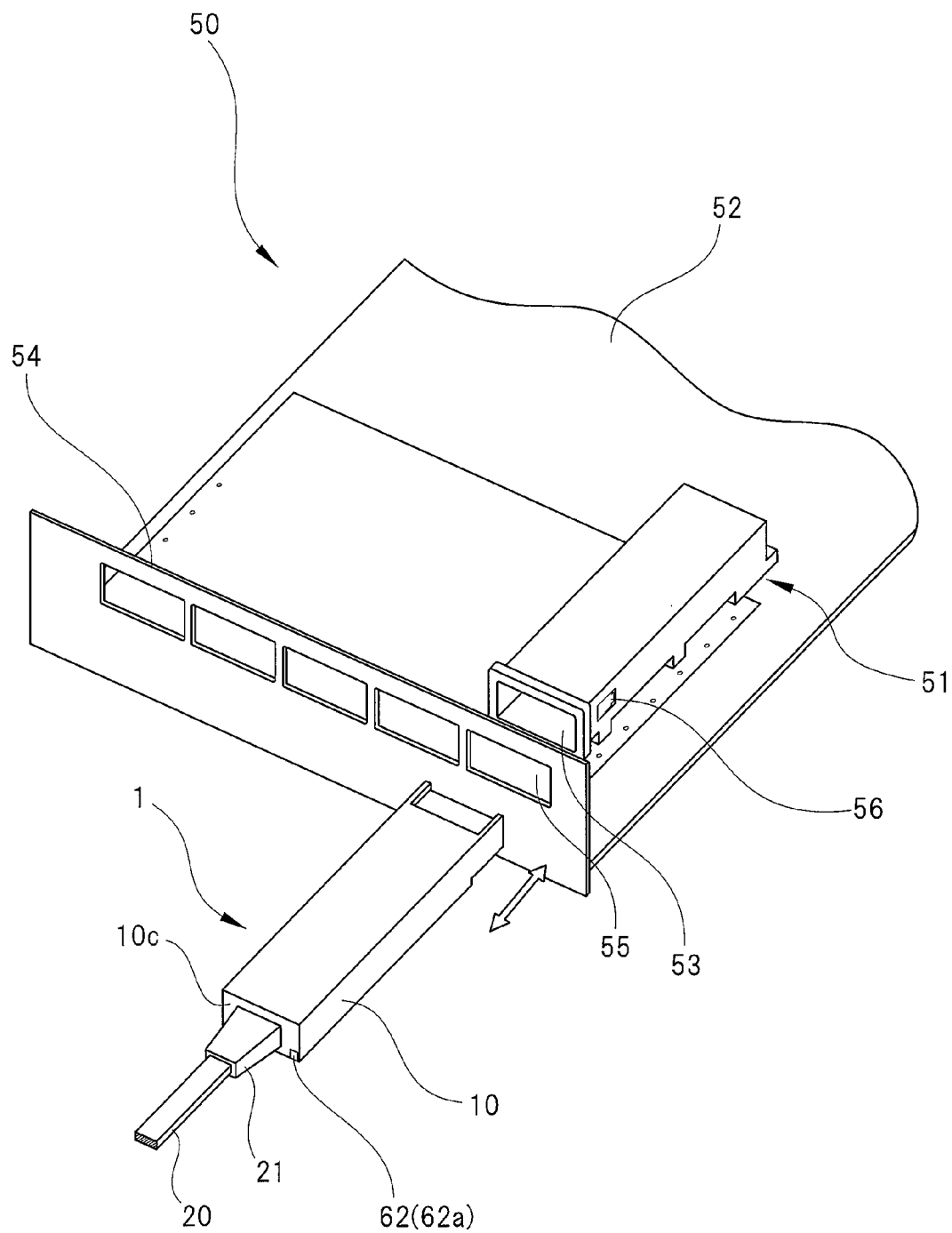
FIG. 1 is a perspective view of a cage provided in a communication device and a communication module inserted to and removed from the cage.

Hereinafter, an example of an embodiment of the present invention will be described. As shown in FIG. 1, a communication module 1 according to the present embodiment includes a housing 10 and a communication cable (optical fiber cable) 20 connected to the housing 10. The communication module 1 is inserted to and removed from a cage 51, which is provided in a communication device 50 such as a server or a network switch. The communication module 1, which is inserted in the cage 51, in other words, connected to the communication device 50, converts optical signals into electric signals and converts electric signals into optical signals. Therefore, a photoelectric converting unit is incorporated in the housing 10 of the communication module 1. The photoelectric converting unit is configured of a light-emitting element (for example, VCSEL (Vertical Cavity Surface Emitting Laser)), a light-receiving element (for example, PD (Photodiode)), a driving IC for driving the light-emitting element, an amplifying IC for amplifying the electric signals output from the light-receiving element and others. Although FIG. 1 shows only the housing 10 to which one end of the optical fiber cable 20 is connected, the other end of the optical fiber cable 20 is also connected to a similar housing, and a photoelectric converting unit is incorporated also in the housing in practice. Namely, the communication module 1 according to the present embodiment is a communication module generally referred to as an active optical cable (AOC).

The cage 51 is provided on a substrate (host board 52) of the communication device 50. The cage 51 is a sheet metal formed into a box shape, and an opening 53 thereof communicates with a slot 55, which is provided in a panel 54 of the communication device 50. The communication module 1 (housing 10) is inserted into the cage 51 through the slot 55 and is removed from the cage 51 through the slot 55.

The communication module 1 is provided with a plug connector as a module connector, and a receptacle connector is provided in the cage 51. When the communication module 1 is inserted into the cage 51, the plug connector is fitted with the receptacle connector, and both of them are connected to each other. Namely, the communication module 1 and the communication device 50 are connected to each other.

A communication semiconductor chip is mounted on the host board 52, and the communication module 1 connected to the communication device 50 is connected to the communication semiconductor chip via electric wiring formed on the host board 52. Further, the host board 52 is provided with a plurality of cages, which are similar to the cage 51 shown in FIG. 1, and the panel 54 is provided with slots corresponding to the respective cages.

Figure 2:
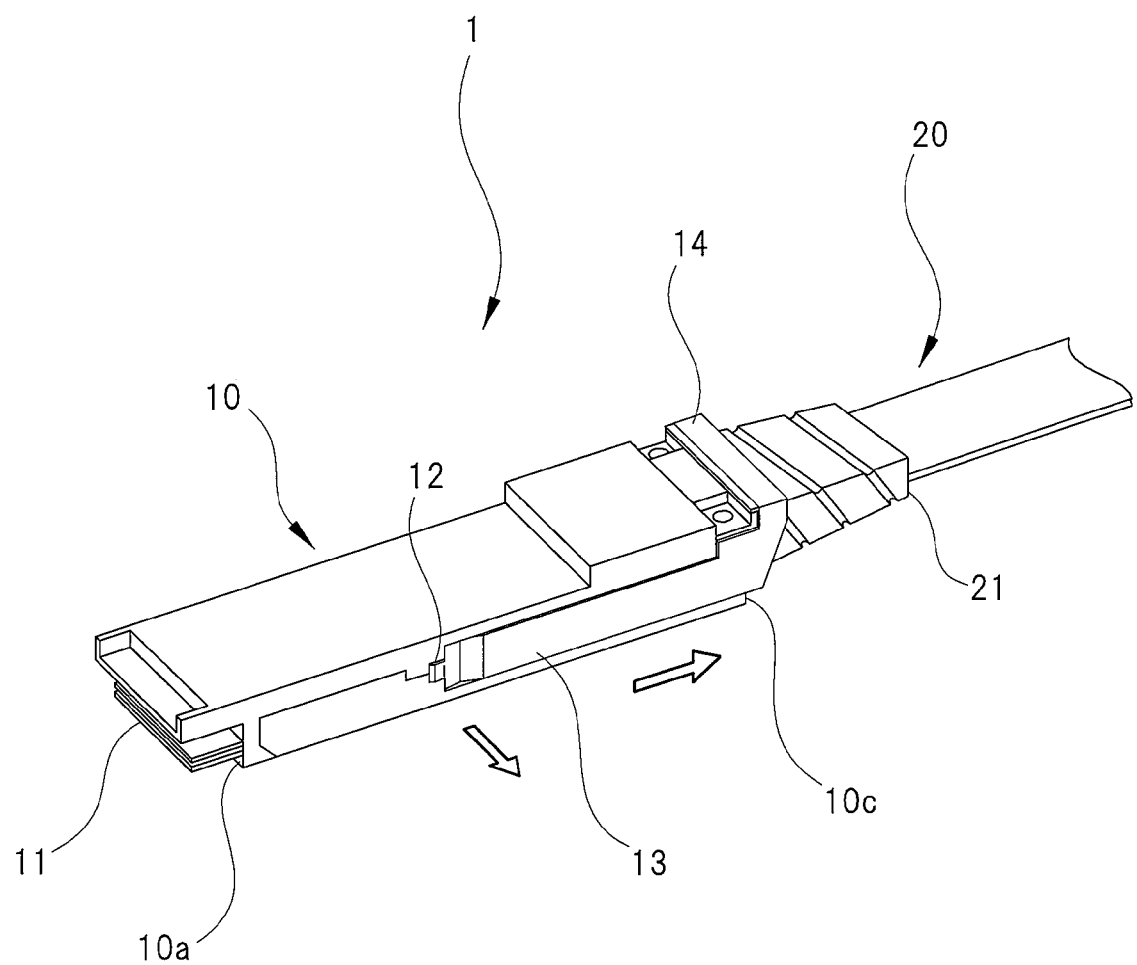
FIG. 2 is a perspective view of the communication module.

As shown in FIG. 2, the communication module 1 includes the metal housing 10 having the shape and dimensions capable of being inserted to and removed from the cage 51 (FIG. 1). The plug connector 11 is provided at one longitudinal end surface of the housing 10, and the optical fiber cable 20 is connected to the other longitudinal end surface of the housing 10. Namely, in the present embodiment, the one longitudinal end surface of the housing 10 is a first surface of the housing 10 where the module connector (plug connector 11) is provided, and the other longitudinal end surface of the housing 10 is a third surface of the housing 10 opposed to the first surface. In other words, the surface of the housing 10 where the plug connector 11 is provided is the first surface, and the other surface of the housing 10 where the optical fiber cable 20 is connected is the third surface. In the following description, the surface of the housing 10 where the plug connector 11 is provided will be referred to as "first surface 10a" or "front surface 10a" in some cases. Also, the other surface of the housing 10 where the optical fiber cable 20 is connected will be referred to as "third surface 10c" or "back surface 10c" in some cases.

The plug connector 11 shown in FIG. 2 is a card edge connector formed on one side of a module substrate housed inside the housing 10, and is projecting from the front surface 10a of the housing 10 to the front side. One end of the optical fiber cable 20 is led into the housing 10 from the back surface 10c of the housing 10. A boot 21 which links the inside and the outside of the housing 10 is attached to one end side of the optical fiber cable 20, which is led into the housing 10. As shown in FIG. 1, a part of the boot 21 is projecting from the back surface 10c of the housing 10 to the rear side.

As shown in FIG. 2, engagement holes 12 are provided on both side surfaces of the housing 10. Meanwhile, as shown in FIG. 1, locking pieces 56 are provided on both side walls of the cage 51. When the communication module 1 (housing 10) is inserted into the cage 51, the locking pieces 56 provided on the cage 51 are engaged with the engagement holes 12 which are provided on the housing 10. Namely, the locking pieces 56 and the engagement holes 12 are engaged with each other, which prevents the communication module 1 (housing 10) from coming off from the cage 51.

As shown in FIG. 2, slide members 13 are provided on the both side surfaces of the housing 10. When the slide members 13 are operated to slide, the engagement between the locking pieces 56 and the engagement holes 12 is released, which enables the communication module 1 (housing 10) to be pulled out from the cage 51. Specifically, when the slide members 13 are slid to the rear side, the locking pieces 56 are pushed out from the engagement holes 12 by the tip end portions of the slide members 13, and the engagement between the locking pieces 56 and the engagement holes 12 is released. Note that the slide members 13 are coupled to each other by a coupling portion 14 and integrally slid back and forth. In practice, a tab is attached to the coupling portion 14 so that it can be easily pulled by hand.

Figure 3:
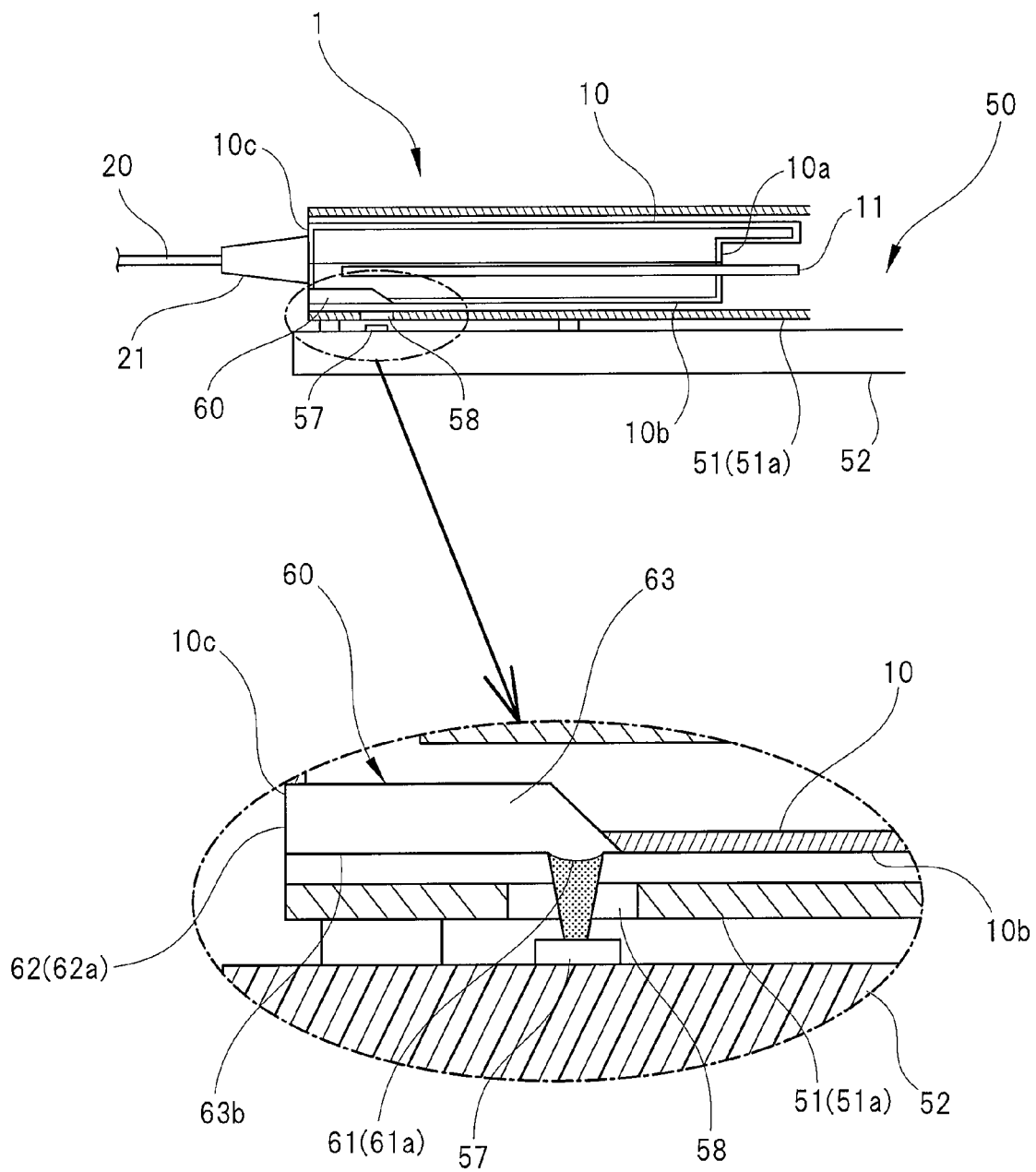
FIG. 3 is a cross-sectional view of the communication module.

As shown in FIG. 3, a LED lamp 57 serving as a light source is mounted on the host board 52 of the communication device 50. The LED lamp 57 functions as a display lamp which shows the connection state between the communication device 50 and the communication module 1 and the signal transmission/reception state between them, etc. Specifically, the LED lamp 57 is turned on when the communication device 50 and the communication module 1 are connected to each other and the communication module 1 is correctly recognized by the communication device 50, and the LED lamp 57 is turned off when the connection between the communication device 50 and the communication module 1 is released. More specifically, the LED lamp 57 is turned on when the plug connector 11 of the communication module 1 is fitted with the receptacle connector of the communication device 50, and the LED lamp 57 is turned off when the plug connector 11 of the communication module 1 is pulled out from the receptacle connector of the communication device 50. Alternatively, the LED lamp 57 may be configured to blink in accordance with the state of transmission/reception of signals (packets) carried out through the communication module 1 when the communication device 50 and the communication module 1 are connected to each other.

The LED lamp 57 is disposed below the cage 51 and is covered by a bottom surface 51a of the cage 51. As a matter of course, a through hole 58 is provided in the bottom surface 51a of the cage 51, and the LED lamp 57 is disposed immediately below the through hole 58. Therefore, the light emitted from the LED lamp 57 enters the interior of the cage 51 through the through hole 58.

The communication module 1 is provided with a light guide 60 which guides the light which has entered the interior of the cage 51 through the through hole 58 provided in the cage 51. The light guide 60 includes a light incoming portion 61 to which the light which has entered the interior of the cage 51 comes in, a light outgoing portion 62 from which the incoming light from the light incoming portion 61 goes out, and a light guiding portion 63 which is disposed across the light incoming portion 61 and the light outgoing portion 62 and guides the incoming light from the light incoming portion 61 to the light outgoing portion 62. As a matter of course, the distinction among the light incoming portion 61, the light outgoing portion 62, and the light guiding portion 63 is given for the sake of convenience of description, and the light incoming portion 61, the light outgoing portion 62, and the light guiding portion 63 are integrally molded from optical plastic.

Figure 4A:
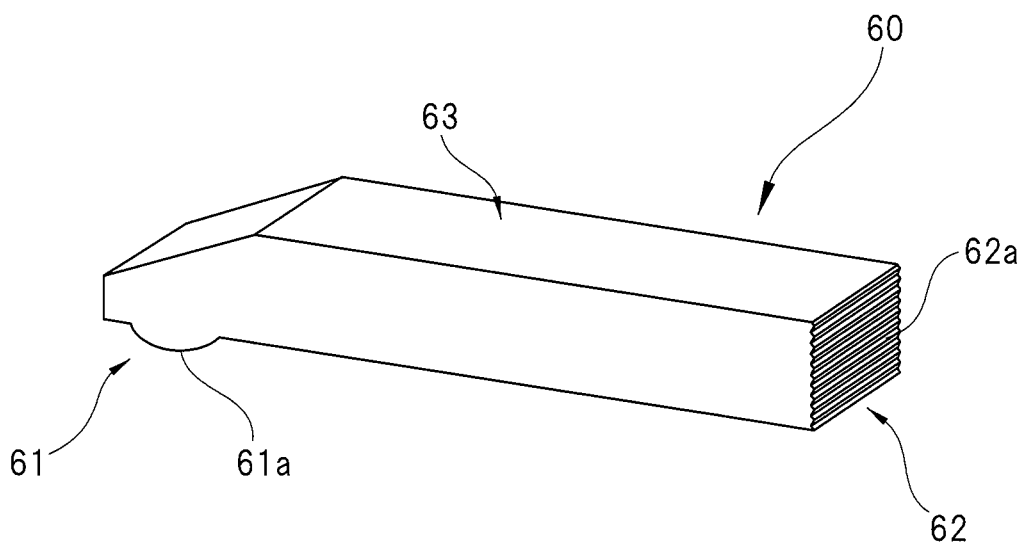
FIG. 4A is a perspective view of a light guide.
Figure 4B:
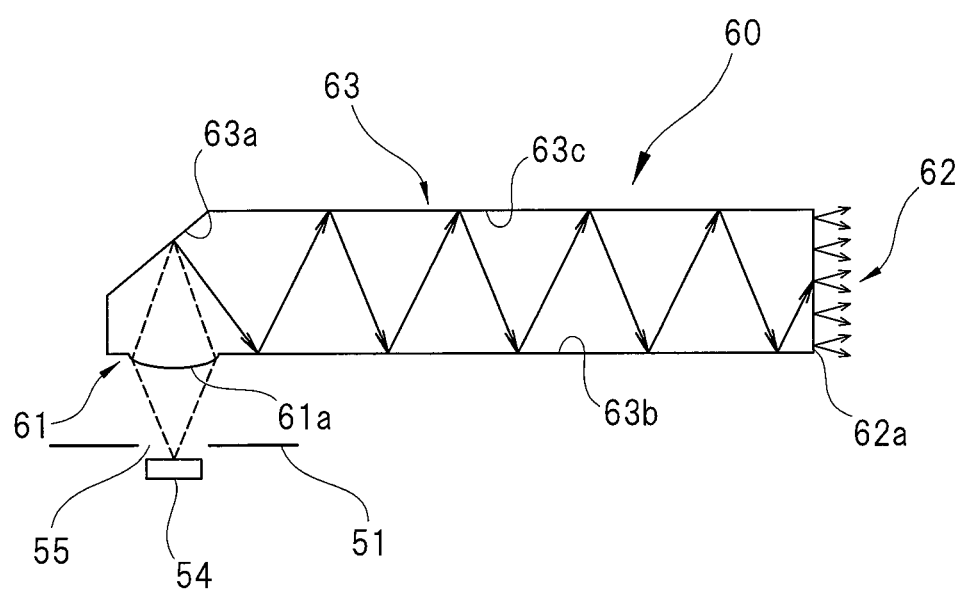
FIG. 4B is a cross-sectional view schematically showing the behavior of light in the light guide.

The light guide 60 will be described in further detail. As shown in FIGS. 4A and 4B, a lens surface 61a, which bulges toward the outer side, is formed in the light incoming portion 61 of the light guide 60. The light guiding portion 63 includes a tilted reflecting surface 63a and a pair of reflecting surfaces 63b and 63c. The light outgoing portion 62 includes a light outgoing surface 62a which is perpendicular to the reflecting surfaces 63b and 63c, and a plurality of recesses and projections are formed on the light outgoing surface 62a.

As shown in FIG. 4B, the lens surface 61a of the light incoming portion 61 is a convex surface and functions as a convex lens which converges the incoming light. The tilted reflecting surface 63a of the light guiding portion 63 is provided at a focal position of the lens surface 61a or in the vicinity thereof and reflects the incoming light toward the reflecting surface 63b. The pair of reflecting surfaces 63b and 63c of the light guiding portion 63 are opposed to each other, the reflecting surface 63b reflects the incoming light toward the reflecting surface 63c, and the reflecting surface 63c reflects the incoming light toward the reflecting surface 63b. In other words, the reflecting surfaces 63a, 63b, and 63c satisfy the total reflection condition in the relation to the incoming light. In the following description, the reflecting surface 63a of the light guiding portion 63 will be referred to as "light-path converting surface 63a", and the reflecting surfaces 63b and 63c of the light guiding portion 63 will be referred to as "total-reflection surfaces 63b and 63c" in some cases.

FIG. 3 will be referenced again. The light guide 60 is attached to the housing 10 so that the light incoming portion 61 of the light guide 60 is disposed at a second surface 10b of the housing 10 opposed to the bottom surface 51a of the cage 51, the light outgoing portion 62 thereof is disposed at the third surface (back surface) 10c of the housing 10, and the light guiding portion 63 thereof extends along the second surface 10b of the housing 10 between the light incoming portion 61 and the light outgoing portion 62. In the following description, the second surface 10b of the housing 10 opposed to the bottom surface 51a of the cage 51 will be referred to as "bottom surface 10b" in some cases.

A positioning recessed portion which is formed to be lower than the surrounding thereof by a certain degree is provided at a corner portion of the housing 10, and the light guide 60 is fitted in the positioning recessed portion. As shown in FIG. 3, when the light guide 60 is fitted in the positioning recessed portion, the lens surface 61a of the light incoming portion 61 is positioned immediately above the through hole 58 provided in the bottom surface 51a of the cage 51. Also, as shown in FIG. 1, the light outgoing surface 62a of the light outgoing portion 62 is flush with or almost flush the back surface 10c at a corner of the back surface 10c of the housing 10. Further, as shown in FIG. 3, the total reflection surface 63b of the light guiding portion 63 is flush with or almost flush with the bottom surface 10b of the housing 10.

As shown in FIG. 4B, the light which has entered the interior of the cage 51 through the through hole 58 is condensed on the light-path converting surface 63a by the lens surface 61a. The light condensed on the light-path converting surface 63a is reflected toward the total-reflection surface 63b by the light-path converting surface 63a and becomes incident on the total-reflection surface 63b. The light which has become incident on the total-reflection surface 63b is reflected toward the total-reflection surface 63c by the total-reflection surface 63b and becomes incident on the total-reflection surface 63c. Thereafter, the light repeats reflection between the total-reflection surface 63b and the total-reflection surface 63c and reaches the light outgoing surface 62a. Namely, the total-reflection surfaces 63b and 63c guide the light to the light outgoing surface 62a, while repeatedly reflecting the light. The light guided to the light outgoing surface 62a goes out from the light outgoing surface 62a. At this time, the light which goes out from the light outgoing surface 62a is diffused by the action of the plurality of recesses and projections formed on the light outgoing surface 62a.

In the above-described manner, the light emitted from the LED lamp 57 which is provided on the host board 52 of the communication device 50 is guided to the back surface 10c of the communication module 1 (housing 10). Therefore, it becomes unnecessary to ensure the space for providing the LED lamp 57 serving as the display lamp on the panel 54 of the communication device 50, so that a plurality of communication modules 1 can be disposed at high density on the panel 54 of the communication device 50. Also, when the communication module 1 is inserted into the slot 55 provided in the panel 54 of the communication device 50, since the light outgoing surface 62a of the light guide 60 is provided on the back surface of the communication module 1 (back surface 10c of the housing 10), which is positioned outside the slot 55, the light which goes out from each of the light outgoing surfaces 62a can be easily and reliably confirmed visually even when the plurality of communication modules 1 are disposed at high density.

Figure 5A:
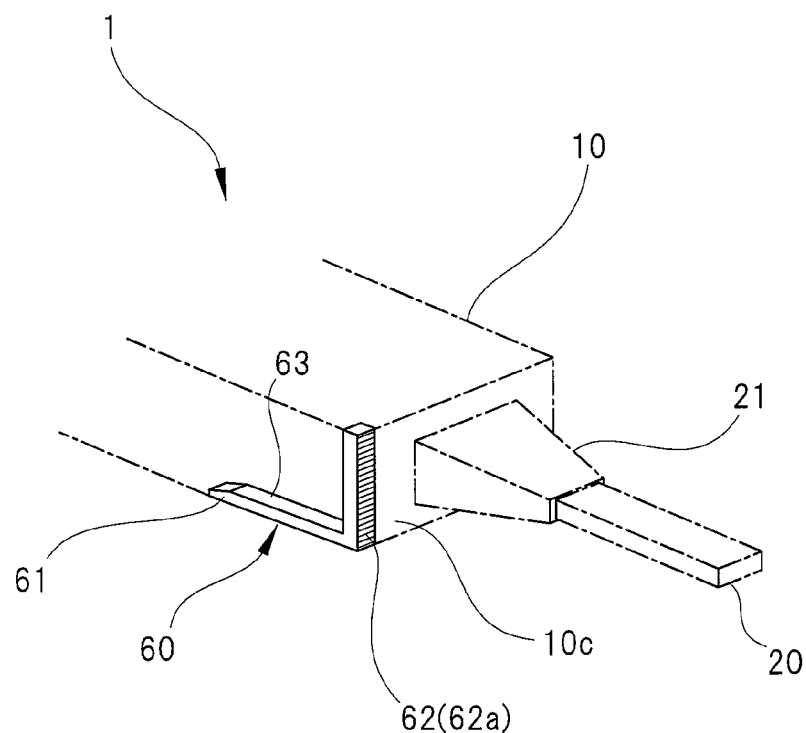
FIG. 5A is a schematic view showing a modification example of an embodiment of the present invention.

The present invention is not limited to the above-described embodiment, and various modifications can be made within the scope of the gist thereof. For example, the light guide 60 shown in FIG. 4A has a linear shape, but the shape of the light guide 60 is not limited to the shape shown in FIG. 4A. Thus, a modification example of the light guide 60 is shown in FIG. 5A. The light outgoing portion 62 of the light guide 60 shown in FIG. 5A has a slender shape extending along one side of the back surface 10c of the housing 10. As a result, the light guide 60 has an approximately L-shaped outer shape in a side view. Since the light outgoing surface 62a of the light guide 60 shown in FIG. 5A has a larger area than the light outgoing surface 62a of the light guide 60 of the above-described embodiment, visibility of the light which goes out from the light outgoing surface 62a is improved. Furthermore, the light outgoing surface 62a of the light guide 60 shown in FIG. 5A has a slender shape extending along one side of the back surface 10c of the housing 10. Therefore, even in a situation in which a part of the light outgoing surface 62a is shaded by the optical fiber cable 20 or the boot 21 attached to the optical fiber cable 20 and visual confirmation of the light going out from that part is hindered, it is possible to visually confirm the light which goes out from the other part of the light outgoing surface 62a. Also in a situation in which a part of the light outgoing surface 62a of the communication module 1 is shaded by the other adjacent communication module 1, the light which goes out from the light outgoing surface 62a of the communication module 1 can be visually confirmed. Furthermore, the light outgoing portion 62 extends over the entire length of the one side of the back surface 10c, and the end surface of the light outgoing portion 62 reaches the upper surface of the housing 10. Therefore, the light can be visually confirmed also from the upper side of the housing 10. This improvement invisibility enables easy and reliable visual confirmation of the light which goes out from the light outgoing surface 62a of each of the communication modules 1 even in a case in which the plurality of communication modules 1 are disposed to be vertically stacked in two or more levels. In addition, the improvement in visibility is particularly effective in a case in which one of two vertically-inverted communication modules 1 is inserted to the slot of the lower level and the other one of the two communication modules 1 is inserted to the slot of the upper level. Furthermore, the improvement in visibility is effective also in a case in which a part of the light outgoing surface 62a is shaded by a pull tab coupled to the housing 10.

Figure 5B:
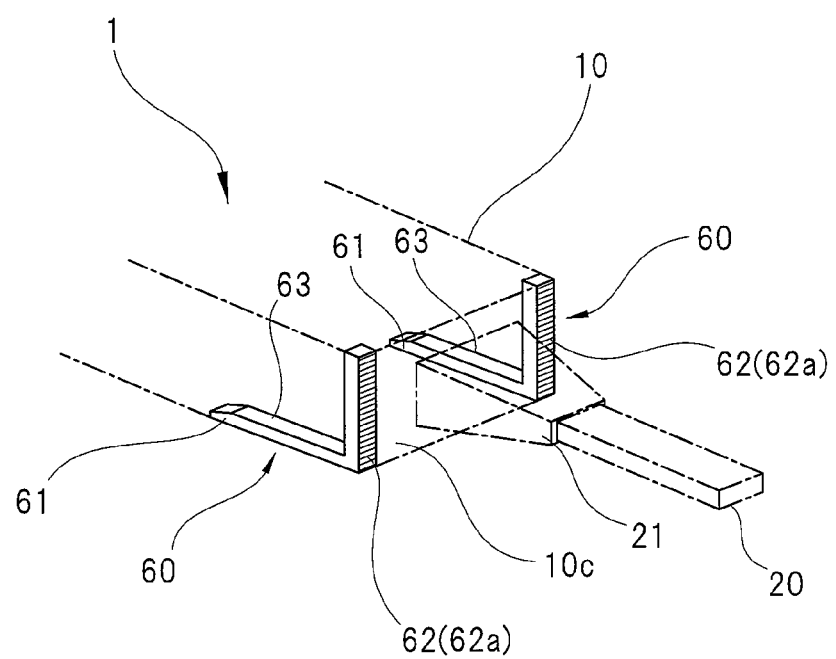
FIG. 5B is a schematic view showing another modification example of the embodiment of the present invention.

Also, the number of the light guides 60 is not particularly limited. For example, if two or more different light sources are provided on the host board 52 of the communication device 50, a plurality of light guides 60 which respectively guide the lights going out from the different light sources can be provided. For example, as shown in FIG. 5B, it is also possible to provide the two light guides 60, each of which corresponds to the light guide 60 shown in FIG. 5A. The visibility can be further improved by providing the two or more light guides 60 in this manner. Furthermore, in the mode shown in FIG. 5B, the light outgoing portion 62 of one of the light guides 60 has a slender shape extending along a side of the back surface 10c of the housing 10, and the light outgoing portion 62 of the other light guide 60 has a slender shape extending along another side of the back surface 10c of the housing 10. In addition, the side along which the light outgoing portion 62 of one of the light guides 60 extends and the side along which the light outgoing portion 62 of the other light guide 60 extends are opposed to each other with the optical fiber cable 20 interposed therebetween. Therefore, even in a case in which the plurality of communication modules 1 are closely disposed in the top-bottom direction and the left-right direction, the light which goes out from the light outgoing surface 62a of each of the communication modules 1 can be easily and reliably confirmed visually.

As a matter of course, it is also possible to provide two or more of the light guides 60 shown in FIG. 4A or other light guides. Furthermore, two or more light guides having different shapes can be used in combination. Also, a reflecting film such as a metal film may be formed on all or part of the reflecting surfaces 63a, 63b, and 63c of the light guide 60.

In the present specification, an example of the embodiment of the present invention has been described by taking an active optical cable as an example. However, the present invention can be applied also to a communication module other than the active optical cable, and effects similar to those described above are obtained also in that case. For example, the present invention can be applied also to an optical transceiver having an insertion port (receptacle) to and from which an optical connector provided at a tip end of an optical fiber cable can be inserted and removed. In addition, the present invention can be applied also to a direct attach cable (DAC) in which connector modules in accordance with the standards of SFP+ or the like are provided at both ends of a metal cable (electric wire). Namely, the present invention can be applied to a communication module in which a communication cable is fixed to a housing as well as a communication module in which a communication cable is attachable to and detachable from a housing. Further, the present invention can be applied also to a communication module provided with a photoelectric converting function as well as a communication module not provided with a photoelectric converting function.

What is claimed is:

1. A communication module inserted into and removed from a cage provided on a substrate of a communication device, the communication module comprising:
    a metal housing;
    a module connector provided at a first surface of the metal housing and connected to a connector provided in the communication device; and
    a light guide configured to guide light that has gone out from a light source provided on the substrate and has entered an interior of the cage through a through hole provided in the cage, wherein
        the light guide includes a light incoming portion to which the light which has entered the interior of the cage comes in, a light outgoing portion from which the light coming in from the light incoming portion goes out, and a light guiding portion configured to guide the light coming in from the light incoming portion to the light outgoing portion,
        the light incoming portion is disposed at a second surface of the metal housing opposed to a bottom surface of the cage provided with the through hole,
        the light outgoing portion is disposed at a third surface of the metal housing opposed to the first surface,
        the light guiding portion extends between the light incoming portion and the light outgoing portion along the second surface,
        a lens surface configured to converge the light which has entered the interior of the cage is formed in the light incoming portion, and
        a plurality of recesses and projections configured to diffuse the light guided by the light guiding portion to outside are formed in the light outgoing portion.

2. The communication module according to claim 1, wherein the light outgoing portion has a slender shape extending along one side of the third surface.

3. A communication module inserted into and removed from a cage provided on a substrate of a communication device, the communication module comprising:
    a metal housing;
    a module connector provided at a first surface of the metal housing and connected to a connector provided in the communication device; and
    a plurality of light guides configured to guide lights that have gone out from a plurality of light sources provided on the substrate and has entered an interior of the cage through through holes provided in the cage, wherein each of the light guides is configured to guide lights that have gone out from different light sources, each of the light guides includes a light incoming portion to which the light which has entered the interior of the cage comes in, a light outgoing portion from which the light coming in from the light incoming portion goes out, and a light guiding portion configured to guide the light coming in from the light incoming portion to the light outgoing portion, the light incoming portion is disposed at a second surface of the metal housing opposed to a bottom surface of the cage provided with the through hole, the light outgoing portion is disposed at a third surface of the metal housing opposed to the first surface, the light guiding portion extends between the light incoming portion and the light outgoing portion along the second surface, a lens surface configured to converge the light which has entered the interior of the cage is formed in the light incoming portion, and a plurality of recesses and projections configured to diffuse the light guided by the light guiding portion to outside are formed in the light outgoing portion.

4. The communication module according to claim 3, wherein the plurality of light guides include two light guides, and the light outgoing portion of one of the light guides has a slender shape extending along one side of the third surface and the light outgoing portion of the other light guide has a slender shape extending along another side of the third surface.

\* \* \* \* \*